INVENTORS
ALFRED J. MUNN
HARMON A. POOLE, JR.
BY Ernest Iversen
ATTORNEY 3,234,967
CONTROL VALVE
Alfred J. Munn, Wayne, N.J., and Harmon A. Poole, Jr., Simsbury, Conn., assignors to Specialties Development Corporation, Belleville, N.J., a corporation of New Jersey
Filed June 10, 1963, Ser. No. 286,586
3 Claims. (Cl. 137—625.45)

The present invention relates to valves, and, more particularly, to valves for proportioning the flow of gaseous medium under pressure through two passages.

Accordingly, an object of the present invention is to provide an improved valve of the foregoing type.

Another object is to provide such a valve which can be utilized to cause the gaseous medium to produce desired operations.

A further object is to provide such a valve which is simple, practical and economical in construction, and is accurate and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a valve which comprises a body formed with chamber means having inlet means for connection to a supply of gas under pressure and having two independent outlets for directing the gas to its point of use, a fixed element in the chamber means having two openings disposed in a common plane at one side of the element and having a partition between the openings for isolating the openings from each other, both of the openings being in flow communication with the inlet means upstream of the outlets and each of the openings being in flow communication with only one of the outlets, a control member mounted for sliding movement across the openings at the upstream side of the openings and constructed and arranged for opening one of the openings while closing the other of the openings and vice versa, and means for effecting movement of the control member.

A preferred embodiment of the invention has been chosen for purposes of illustration and description, and is shown in the accompanying drawing, forming a part of the specification, wherein.

Figure 1:
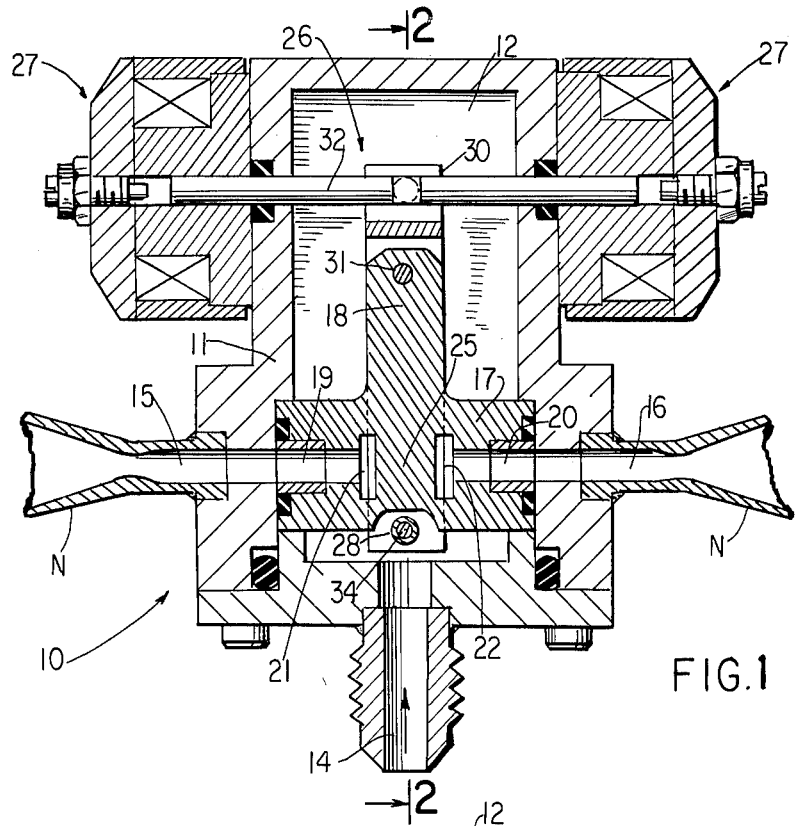
FIG. 1 is a longitudinal sectional view of a valve in accordance with the present invention.
Figure 2:
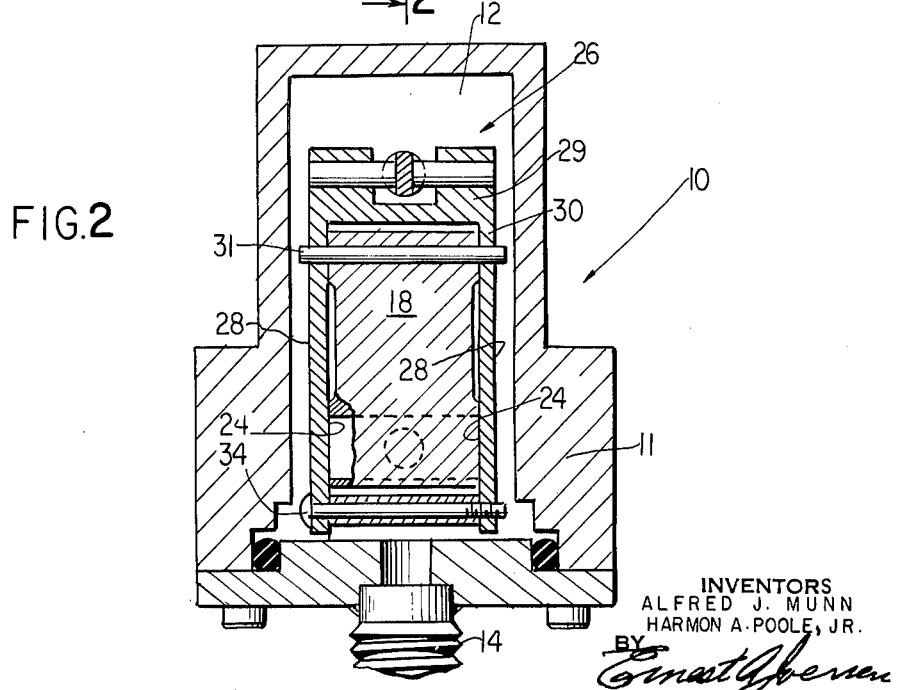
FIG. 2 is a sectional view taken along the line 2—2 on FIG. 1.

Referring now to FIGS. 1 and 2 of the drawing in detail, a valve 10 is shown which comprises a valve body 11 provided with a chamber 12 formed with an inlet 14 for connenction to a source of gaseous medium under pressure (not shown) and a pair of outlets 15 and 16 for connection to the point of use of the gaseous medium; a block 17 anchored in the chamber 12 having a post 18 thereon and being formed with a pair of outlets 19 and 20 respectively in flow communication with the outlets 15 and 16 and with pairs of openings or ports 21 and 22 in opposite flat sides 24 of the block, the openings 21 and 22 being isolated by a partition 25 and being in flow communication with the chamber 12; a control member 26; and motor means 27 for operating the control member.

The control member 26 includes a pair of flat plates 28 rigidly mounted by a cross-piece 29 on a lever 30 which is pivotally mounted at 31 on the post 18 to slide the plates 28 across the flat sides 24 at the upstream side of the ports or openings 21 and 22 in the block 17 and to thereby control the extent of uncovering of the ports; and a connecting rod 32 operated by the motor means 27 to oscillate the plates 28 across the ports 21 and 22. The lower ends of the plates 28 are secured against spreading apart by a bolt 34 so that gaseous pressure cannot flex the plates and cause unclosing of the ports when the ports should be nearly or fully closed.

The valve 10 is adapted for alternately creating thrusts in opposite directions by discharging gaseous medium under pressure through typical space nozzles N of a missile which nozzles are connected to the outlets 15 and 16 of the valve body 11. The valve is also adapted for controlling the operation of gaseous pressure medium powered apparatus (not shown) by connecting the outlets 15 and 16 to inlets of such apparatus.

In operation, gaseous medium under pressure enters the chamber 12 by way of the inlet 14 and exits by way of the ports or openings 21 and 22 and the outlets 19 and 20 in flow communication therewith while the position of the control member 26 determines the flow rate of the gaseous medium through the respective pairs of ports 21 and 22.

From the foregoing description, it will be seen that the present invention provides an improved control valve for numerous purposes where the flow of gaseous medium under pressure is to be proportioned to provide a thrust adapted for steering missiles and the like or to effect operation of mechanisms.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. A valve comprising a body provided with chamber means having inlet means for connection to a supply of gas under pressure and having two independent outlets for directing the gas to its point of use, a fixed element in said chamber means having a pair of aligned openings disposed in a common plane at opposite sides of said element and having a partition between said openings for isolating said openings from each other, both of said openings at each side being in flow communication with said inlet means upstream of said outlets and each of said openings at each side being in flow communication with only one of said outlets, a control member having a pair of connected plate portions mounted for sliding movement across said openings at the upstream side of said openings at each side and each plate portion being constructed and arranged for opening one of said openings while closing the other of said openings and vice versa at one side of said element, and means for effecting movement of said control member.

2. A valve according to claim 1, wherein said control member is pivotally mounted to oscillate said plate portions across said openings.

3. A valve according to claim 2, wherein said plate portions are rigidly connected at both ends thereof to prevent distortion thereof by the gas under pressure.

References Cited by the Examiner
UNITED STATES PATENTS
3,026,856  3/1962  Olmsted _____ 137—625.63
FOREIGN PATENTS
941,632  7/1948  France.

M. CARY NELSON, *Primary Examiner.*
MARTIN P. SCHWADRON, *Examiner.*